A. L. & G. D. MOORE.
STUMP CUTTING MACHINE.
APPLICATION FILED NOV. 24, 1913.
1,104,535.
Patented July 21, 1914.
2 SHEETS—SHEET 2.
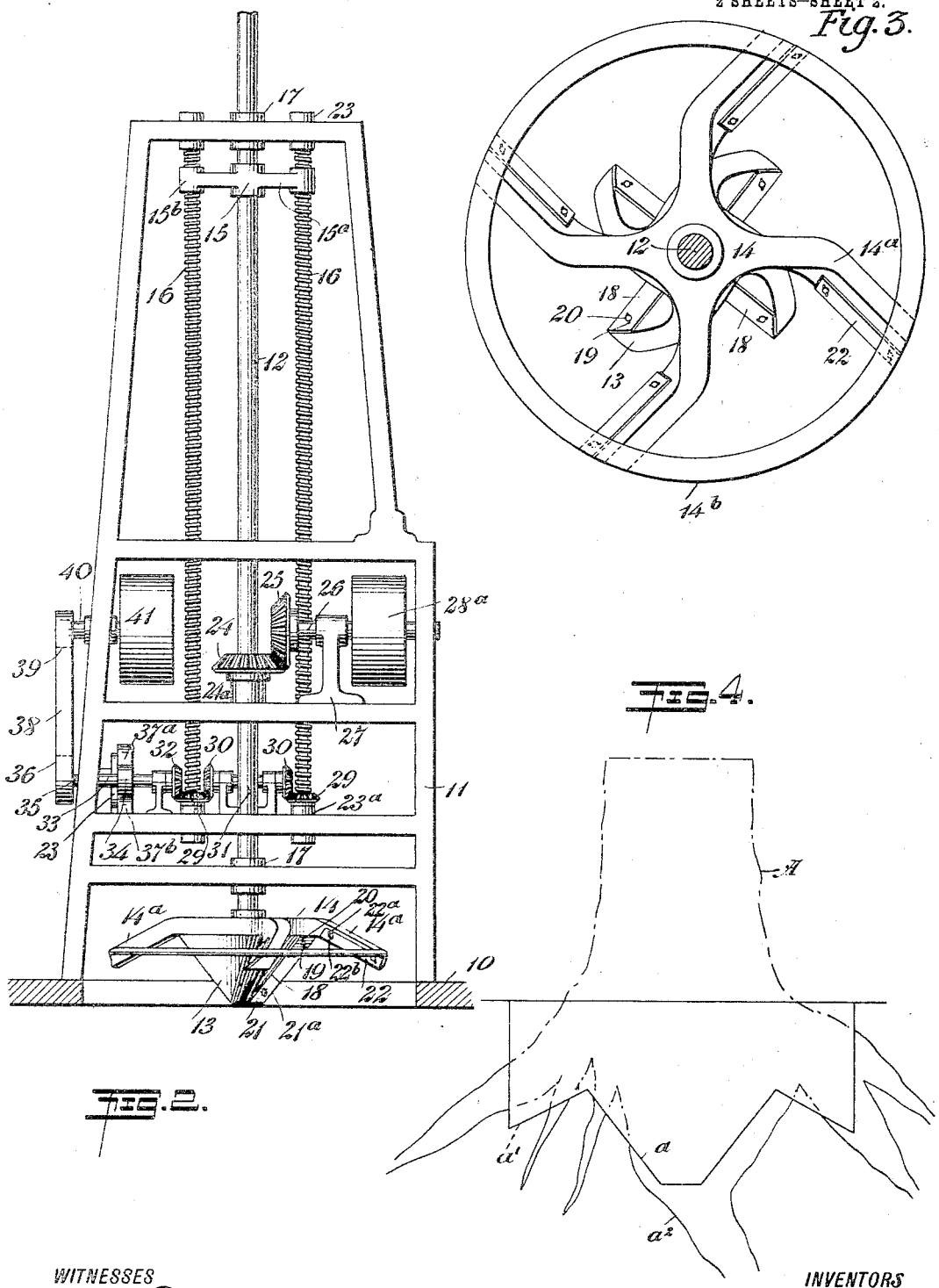
WITNESSES
G. Robert Thomas
J. L. McAuliffe
INVENTORS
Ambrose L. Moore
George D. Moore
BY
Munn & Co
ATTORNEYS

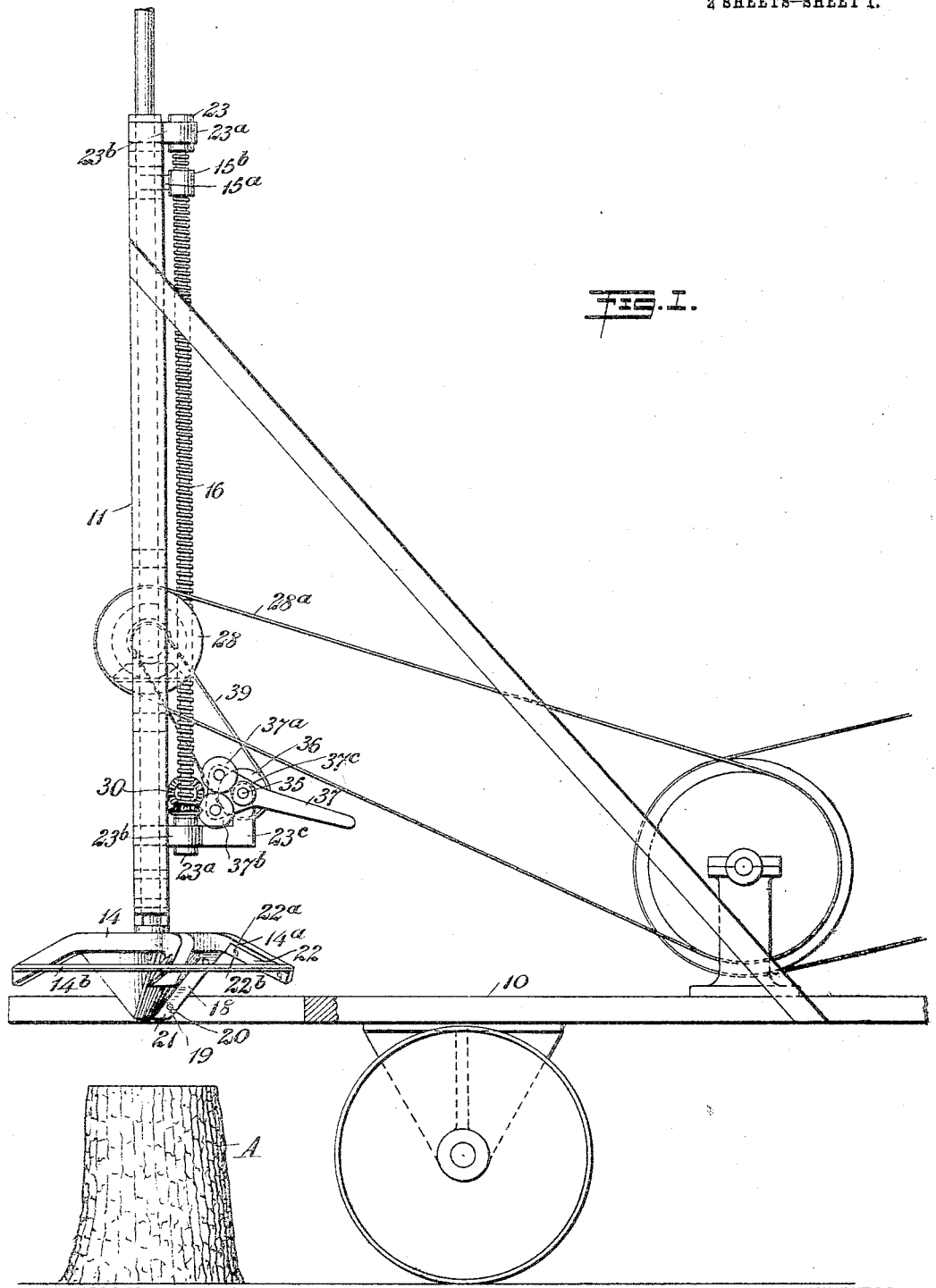

UNITED STATES PATENT OFFICE.

AMBROSE LARKIN MOORE AND GEORGE DANIEL MOORE, OF NEW ORLEANS, LOUISIANA.

STUMP-CUTTING MACHINE.

1,104,535.   Specification of Letters Patent.   Patented July 21, 1914.

Application filed November 24, 1913. Serial No. 802,666.

*To all whom it may concern:*

Be it known that we, AMBROSE L. MOORE and GEORGE D. MOORE, citizens of the United States, and both residents of New Orleans, in the parish of Orleans and State of Louisiana, have invented a new and Improved Stump-Cutting Machine, of which the following is a full, clear, and exact description.

Our invention relates to a machine for removing stumps by cutting means adapted to be lowered from above the stump, and gradually fed to the latter until the complete stump is cut away, leaving only the minor roots, the action of the cutter being such as to cause the chips or shavings to be thrown outward by centrifugal force.

The invention will be particularly explained in the specific description following.

Reference is to be had to the accompanying drawings forming a part of this specification, in which similar characters of reference indicate corresponding parts in all the views.

Figure 1 is a side elevation of our improved stump-cutting means, the view including a conventional showing of a portion of the tractor mounting the cutting means; Fig. 2 is a front elevation; Fig. 3 is a plan view of the cutter heads, the shaft thereof being in horizontal section; and Fig. 4 is a diagrammatic view indicating the manner in which a stump is cut by our improved machine.

In constructing the illustrated practical embodiment of our invention any approved form of tractor 10 is employed, and on an upright frame 11, substantially in A-form, the cutting devices and their actuating means are mounted. An upright shaft 12 carries at its lower end an advanced cutter-head 13 and a second cutter-head 14 above the same. A hub or collar 15 is suitably secured to the shaft 12 and has arms 15ᵃ thereon, the outer ends of which terminate in nuts or interiorly threaded collars 15ᵇ that are received on a pair of feed screws 16, which are adapted to be turned in unison, or reversed for raising and lowering the shaft 12 and the cutter heads in the manner hereinafter described. The shaft 12 has suitable bearings in the frame 11, there being upper and lower bearings 17 indicated.

The cutter-head 13 is provided with a series of arms carrying knives 18, formed with slots 19 that receive pins 20 on the cutter head for adjusting the knives. The cutter head tapers toward the bottom and the knives 18 incline rearwardly and outwardly from the lower ends 21, said lower ends and the outer side edges forming cutter edges. The knives also have a bodily inclination rearwardly and inwardly from their front cutting edges 21ᵃ. The upper cutter head 14 presents radial arms 14ᵃ, which toward the outer ends have a downward and forward inclination, and are provided with knives 22 having a slot and pin connection 22ᵃ, 22ᵇ, with the arms to provide for adjustment of the said knives. The forward faces of the inclined portions of the arms 14ᵃ and the knives 22 are also inclined upwardly and rearwardly.

As the cutter heads are lowered the stump A will be gradually cut away, a central cavity of truncated conical form, as indicated by $a$ in Fig. 4, being produced by the advance cutter head 13, and a complementary annular depression $a'$ will be produced around the central cavity until only the minor roots $a^2$ of the stump remain. In the operation of the cutter head centrifugal force will throw the chips and shavings outwardly in all directions.

The feed screws 16 turn in upper and lower bearings 23, 23ᵃ, which may be formed on brackets 23ᵇ, as indicated in Fig. 1.

To turn the shaft 12 for rotating the cutter heads, said shaft is provided in the example shown, with a bevel pinion 24 meshing with which is a similar pinion 25 on a drive shaft 26, the outer end of which may have a bearing in the frame 11, and at an intermediate point on a stand 27, there being a belt pulley 28 to receive a belt 28ᵃ, driven from any suitable source of power on the tractor 10.

For turning the feed screws 16 to raise and lower the shaft 12 and the cutter heads, we have shown the said screws provided with bevel pinions 29, which are geared together by bevel pinions 30 and a shaft 31. Meshing with one of the bevel pinions 29 is a pinion 32 on a driven shaft 33, which may be actuated in opposite directions by a friction drive or equivalent means. We have illustrated the drive as consisting of a friction pulley 34 fast on the shaft 33 and actuated in either direction from a shaft 35 having a drive pulley 36, on which is loosely mounted a lever 37, which carries friction pulleys 37ᵃ, 37ᵇ, one of which is in frictional engagement with a friction pulley 37ᶜ on the shaft 35. By rocking the lever 37 either intermediate pulley 37ᵃ or 37ᵇ may be thrown into engagement with the friction pulley 34 on the shaft 33, and thus the latter shaft may be turned in either direction to so turn the screws 16 as to raise or lower the shaft 12 in the cutter heads. A belt pulley 38 runs over the pulley 36 and over a pulley 39 on a counter shaft 40 carrying a belt pulley 41 to be driven by a belt (not shown) from any convenient driven pulley on the tractor.

It is to be understood that the shaft 12 is free to slide in the bearings 17 as well as to turn therein, and the connection with the pinion 24 and its hub 24ᵃ is such that the shaft will be turned by said pinion, but is free to slide therein.

The means for supporting the bearings 23ᵃ at the lower end of the feed screws, and supporting the shaft 35 and the friction gear elements associated with it consist, in the example shown, of a bracket 23ᵇ secured to the frame 11 having an extension 23ᶜ forming a bearing for the shaft 35.

In practice, the radial arms 14 are provided with a ring 14ᵇ extending around the arms, near the outer ends thereof, said ring constituting a brace and strengthener for preventing the springing of the arms when the cutter is in operation.

Having thus described our invention, we claim as new and desire to secure by Letters Patent:

1. In a stump-cutting machine, a driven upright shaft mounted to be raised and lowered, an advance cutter head carried by said shaft at the lower end, said head having knives diverging in an upward direction, and a second cutter head on said head above and co-axial with the advance cutter head, said second cutter head having arms extending outwardly beyond the first cutter head, the outer ends of the arms being downwardly and forwardly inclined and provided with forward faces, the latter having knives thereon, the knives having an inclination rearwardly and upwardly and having forwardly disposed cutting edges at the outside and at the bottom ends thereof.

2. In a stump-cutting machine, an upright shaft mounted to be raised and lowered, means for driving said shaft, and stump-cutting means comprising a central advance cutter head having knives that diverge in an upward direction, said knives having transverse cutting edges at their lower ends, and the outer edges thereof being also cutting edges, and members above the advance cutter head and extending outwardly beyond the latter, and forwardly and downwardly inclined, the said members having cutter knives thereon presenting forward cutting edges.

3. In a stump-cutting machine, a driven shaft mounted to be raised and lowered, a downwardly tapered advance cutter head on the lower end of the shaft, said head having cutter knives diverging in an upward direction, and upper cutter members on the shaft overhanging above and outside of the tapered cutter head, the said overhanging portions of said members having a downward inclination and provided with cutter knives.

In testimony whereof we have signed our names to this specification in the presence of two subscribing witnesses.

AMBROSE LARKIN MOORE.
GEORGE DANIEL MOORE.

Witnesses:
PETER B. ZIMMER,
GEORGE MILLER.